Jan. 10, 1939.   H. NIEDERREITHER   2,143,793
BRACING FOR ASSEMBLED ELECTROLYTIC CELL BODIES OR THE LIKE
Filed March 31, 1937
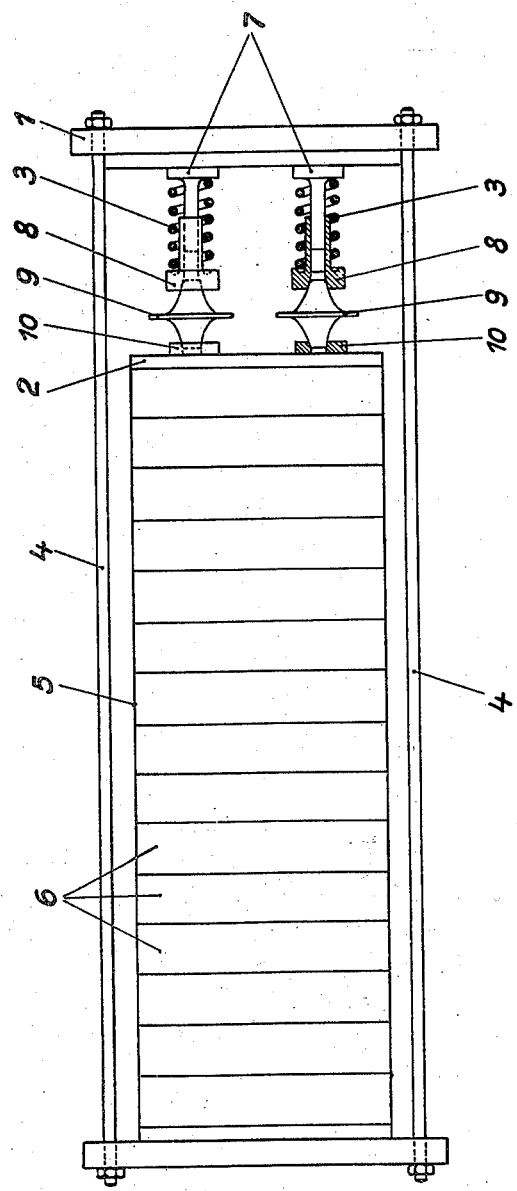
Inventor:
Hans Niederreither
By: Mason & Porter
attorneys Patented Jan. 10, 1939

2,143,793

UNITED STATES PATENT OFFICE 2,143,793

BRACING FOR ASSEMBLED ELECTROLYTIC CELL BODIES OR THE LIKE

Hans Niederreither, Munich, Germany

Application March 31, 1937, Serial No. 134,154
In Germany March 30, 1936

1 Claim. (Cl. 204—5)

The present invention relates to a bracing for assembled electrolytic cell bodies or the like.

In electrolyzers the cell bodies of which are held together by means of tie rods as is usual in filter presses, it has been impossible, so far, to prevent the electrolyte and gas from escaping through the joints of the several elements. The remedy tried consisted in the drip lye being collected in pans and subsequently returned to the electrolyzer. On account of the long time of contact with the air and the large surface exposed there will be formed a substantial percentage of badly conducting carbonates in the drip lye, which adversely affect the efficiency of the electrolyzer, while the gas escaping through the leaky joints is definitely lost.

This escape of electrolyte and gas is particularly objectionable to the safety of operation in the case of pressure electrolyzers in which the intermediate space between the cell body and the pressure vessel is filled with a solid, liquid or gaseous insulating material. The escaping lye results in shunting and short-circuiting within the insulated space, which troubles may lead to a failure or even destruction of the cell bodies. The gases which escape or are developed in the insulating space may form explosive mixtures which are liable to be ignited by sparks produced when circuits are closed. Certain attempts to tighten the several joints and leaky spots respectively by means of hardening agents, such as cements, special putties or the like, were successful for a short time only as rather soon the leaks reappeared in their initial magnitude.

Also the use of materials having the same expansion coefficients, e. g. concrete and iron for the cell bodies and tie rods respectively did not result in a better success.

According to the present invention a satisfactory and permanently tight cell body can be obtained by the insertion of resilient members, for instance springs, between the cell body and the bracing or in the bracing or also in the cell body itself. By this measure the pressure acting on the several parts of the cell body is caused to remain substantially constant and always so high that perfect tightness is secured.

As experience has shown, a permanently tight cell body was not obtained with the former construction on the grounds that, in contrast to what might be expected, various and changing temperatures arose during operation in the cell body and in the neighborhood of the tie rods, which temperatures resulted in different expansions at the points concerned. The hot electrolyte will cause the cell body to expand in a higher degree than the tie rods influenced by the cooler insulating material. Unless special measures are taken this larger expansion will result in a permanent elongation of the tie rods. In the case of low loads the temperature of the electrolyte may drop below that of the insulating material. When however the temperature decreases in the cell body, the same will contract beyond its initial length as it has been shortened by the high pressure undergone, whereas the tie rods have increased in length. On account of this reduced length of the cell body together with the increased length of the tie rods the pressure will at low temperatures sometimes drop to zero so that leakiness will be the consequence thereof. As a rule however the temperature producing leakiness may differ so little from the ordinary temperature of the electrolyte that the critical temperature is even above that of the insulating material.

By an operation with unvaried or rising but never dropping temperatures the inconveniences referred to could be obviated up to a certain degree. But such an operation can be accomplished rather difficultly only and it is safer and simpler to insert a resilient member according to the invention, such as a spring, which permits of the expansion and contraction of the cell body and the tie rods without the pressure acting thereon being sensibly changed.

One of the numerous possible embodiments of the present invention is shown diagrammatically in the accompanying drawing.

According to the invention several cylindrical helical springs 3 are inserted between the press plate 1 and the cell body end plate 2. When the tie rods are being tightened the springs exert a corresponding pressure on the cell body 5 comprising a plurality of elements 6. By telescopic guide pins 7, 8 fastened to the press plate 1 and to insulating porcelain bodies 9 respectively and provided with suitable abutments the springs 3 are prevented from bulging laterally. The other ends of the porcelain bodies 9 rest in sockets 10 screwed to the cell body end plate 2. By these guides and screw joints the springs are prevented from bulging, and in the case of a horizontal arrangement of the cell body the own weight thereof is taken up.

When in operation the cell body 5 expands more substantially than the tie rods 4 the springs 3 are compressed and when it contracts the springs exert the pressure required.

It is a matter of course that the bracing described may also be applied to the tanks of electrolytic cells composed of several parts and held together by tie rods.

What I claim as my invention, and desire to secure by Letters Patent, is—

An electrolytic apparatus comprising a cell body including individual cell units, a press plate at each end of the cell body, tie rods joining the press plates, one of said press plates being spaced from the cell body, insulating members disposed between the spaced press plate and the end plate of the cell body and bearing against said end plate, a pair of telescoping guides disposed between each insulating member and the end plate, and a helical spring mounted on each pair of guides for yieldingly holding the cell units in contact with each other.

HANS NIEDERREITHER.